[11] 3,602,578

[72] Inventors Raymond E. Tibbetts
Mahopac;
Janusz S. Wilczynski, Ossining, both of, N.Y.
[21] Appl. No. 25,127
[22] Filed Apr. 2, 1970
[45] Patented Aug. 31, 1971
[73] Assignee International Business Machines Corporation
Armonk, N.Y.

[54] MICRO-OBJECTIVE REDUCTION LENS SYSTEM
2 Claims, 6 Drawing Figs.
[52] U.S. Cl. ................................................. 350/215
[51] Int. Cl. ................................................. G02b 9/62
[50] Field of Search ...................................... 350/215

[56] References Cited
UNITED STATES PATENTS
3,395,962   8/1968   Herzberger et al. .......... 350/215
3,450,463   6/1969   Yasuda .......................... 350/215 X Primary Examiner—John K. Corbin
Attorneys—Hanifin and Jancin and John J. Goodwin ABSTRACT: A lens group is described for use as a reduction lens, consisting of 10 lens elements. The first and second elements are cemented together to form a meniscus doublet lens as are the third and fourth, fifth and sixth, eighth and ninth elements. The seventh element is a positive meniscus lens and the 10th element is a biconcave lens. The lens group has very high uniform resolution over the flat image field and has unmeasurable distortion, less than a hundredth part of the wavelength of light. The constructional data of the lens elements have upper and lower limits and nine embodiments of lens groups of the present invention are set forth, all of which provide the high resolution and exceptionally low distortion value.

PATENTED AUG 31 1971 3,602,578

ASTIGMATISM

DISTORTION

INVENTORS
RAYMOND E. TIBBETTS
JANUSZ S. WILCZYNSKI

BY *John J. Goodwin*

ATTORNEY

MICRO-OBJECTIVE REDUCTION LENS SYSTEM

BACKGROUND OF THE INVENTION

FIELD OF THE INVENTION

The present invention relates to an optical lens system and more particularly to a highly corrected flat field microscope objective-type, additionally corrected for distortion and both axial and lateral chromatic aberrations for use over a bandwidth of several hundred Angstroms.

SUMMARY OF THE INVENTION

Reduction lenses of high quality are useful for many applications, particularly in the fabrication of semiconductor integrated circuits by optical methods. The circuits are formed on wafers or "chips" of very small size by separate exposures known as the step and repeat method.

The static image field required for a typical "chip," is 0.078 inches×0.078 inches in size having useful linewidths of 1 micron over this given field size. The reduction lens must have residual field curvature and astigmatism far below the Rayleigh limit and negligible distortion for true orthoscopic reproduction of the electronic circuit. This is due to the necessity of obtaining maximum and constant depth of focus over the entire chip.

An object of the present invention is to provide an optical lens system for use in the step-and-repeat method of photomask and circuit generation.

Another object of the present invention is to provide a highly corrected lens system of the flat field microscope objective-type having minimum astigmatism and field curvature plus unmeasurable distortion.

Still another object of the present invention is to provide a lens system for producing microcircuits having linewidths in the order of one micron which provides the optimum solution for best optical correction, considering the given requirements of resolution, reduction, field coverage, and distortion.

The foregoing and other objects, features and advantages of the invention will be apparent from the following more particular description of the preferred embodiments of the invention, as illustrated in the accompanying drawings.

DESCRIPTION OF A PREFERRED EMBODIMENT

Figure 1:
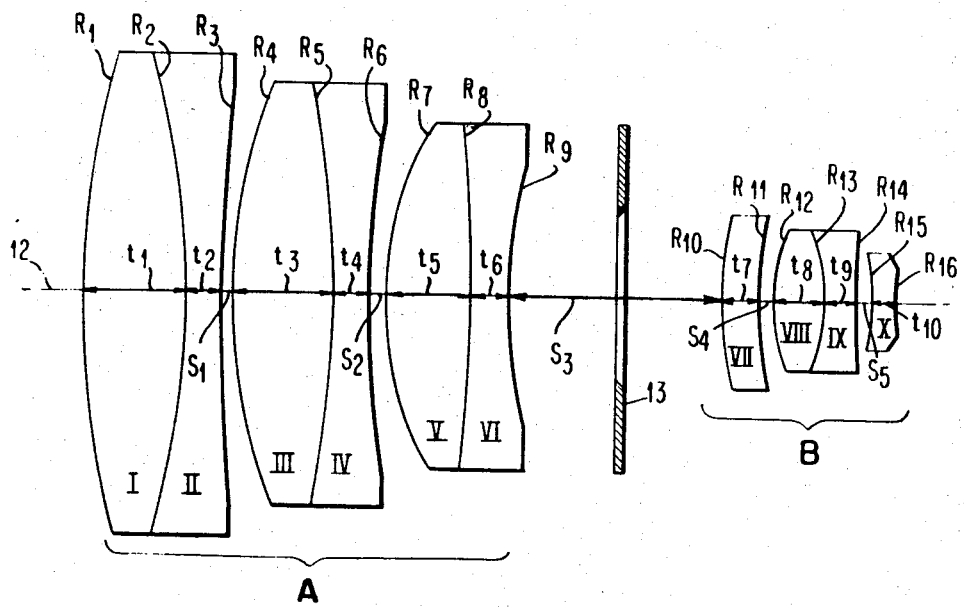
FIG. 1 shows an optical schematic of a reduction lens system constructed according to the present invention.

Referring to FIG. 1, a preferred embodiment of a lens system is shown including ten lens elements designated as elements I, II, III, IV, V, VI, VII, VIII, IX and X. Elements I and II are cemented together to form a meniscus doublet lens as are elements III and IV, V and VI, VIII and IX. The lens elements are optically aligned on an axis 12 to have an effective focal length of 39.68 millimeters, and used at a reduction of 25X covering a static linear image field diagonal of 2.8 millimeters. The diaphragm 13, located 10.23 millimeters to the left of surface $R_{10}$, is 15.0 millimeters in diameter at a numerical aperture (N.A.) of 0.364.

The following Table 1 of mathematical statements lists the range of constructional data related to a preferred embodiment of the lens group shown in FIG. 1.

TABLE 1

| Lens | Radius | Thickness (t) or airspace (S) | $N_D$ | V |
|---|---|---|---|---|
| I | $R_1 = +1.8395F$ | $t_1 = .2268F$ | 1.62032 | 60.3 |
|  | $R_2 = -1.8395F$ |  |  |  |
| II |  | $t_2 = .0882F$ | 1.61989 | 36.4 |
|  | $R_3 = +6.4619F$ |  |  |  |
|  |  | $S_1 = .0252F$ |  |  |
|  | $R_4 = +1.2354F$ |  |  |  |
| III |  | $t_3 = .2142F$ | 1.58256 | 46.5 |
|  | $R_5 = -2.1726F$ |  |  |  |
| IV |  | $t_4 = .0882F$ | 1.61989 | 36.4 |
|  | $R_6 = +2.4952F$ |  |  |  |
|  |  | $S_2 = .0252F$ |  |  |
|  | $R_7 = +0.7284F$ |  |  |  |
| V |  | $t_5 = .1815F$ | 1.58889 | 45.7 |
|  | $R_8 = -3.5495F$ |  |  |  |
| VI |  | $t_6 = .0882F$ | 1.61989 | 36.4 |
|  | $R_9 = +1.1508F$ |  |  |  |
|  |  | $S_3 = .4715F$ |  |  |
|  | $R_{10} = +0.7200F$ |  |  |  |
| VII |  | $t_7 = .0882F$ | 1.51733 | 52.2 |
|  | $R_{11} = +0.9439F$ |  |  |  |
|  |  | $S_4 = .0252F$ |  |  |
|  | $R_{12} = +0.5339F$ |  |  |  |
| VIII |  | $t_8 = .1058F$ | 1.51733 | 52.2 |
|  | $R_{13} = -0.3836F$ |  |  |  |
| IX |  | $t_9 = .0706F$ | 1.61989 | 36.4 |
|  | $R_{14} = +12.601F$ |  |  |  |
|  |  | $S_5 = .0328F$ |  |  |
|  | $R_{15} = -0.6690F$ |  |  |  |
| X |  | $t_{10} = .0680F$ | 1.61989 | 36.4 |
|  | $R_{16} = +0.8905F$ |  |  |  | where F represents the effective focal length of the lens group (39.68 millimeters), $R_1$ through $R_{16}$ represent the respective radii of the successive lens surfaces, $t_1$ through $t_{10}$ designate the thickness of the lens element measured along axis 12 and $S_1$ through $S_5$ represent the spacings between lens elements II and III, IV and V, VI and VII, VII and VIII, and IX and X respectively measured along axis 12. The designations $N_D$ and V, respectively, represent the refractive index and the Abbe number of each lens element.

Referring to FIG. 1, the lens system of ten elements is divided into two distinct lens groups A and B on either side of airspace $S_3$ containing variable diaphragm 13. Group A consists of lens elements I though VI, as three cemented doublets, and provides 82 percent of the total bending of the full N.A. axial ray, the doublet shapes being chosen for minimum residual spherical aberration of the third and fifth order. The total bending of the full N.A. axial ray is calculated by the simple formula:

Bending=$NA(1+1/R)$ where $R$ is the reduction
= 0.364 1+1/25)
= 0.379

The bending effected by Group A is approximately 0.31 and that of Group B is approximately 0.069.

In Group A, each doublet is not corrected autonomously for spherical aberration because the magnitudes of the third and fifth order spherical aberrations are then fixed and are functions of glass choice and lens power if each doublet is approximately achromatic. This type of axial correction could severely restrict coma and astigmatism correction. It is far better to start with nearly achromatic doublets in Group A but during the course of this design, to leave the first doublet somewhat undercorrected for spherical aberration, while doublets III and IV, and V and VI are somewhat overcorrected, the total spherical aberration for Group A still being slightly undercorrected. The induced fifth order spherical aberration introduced by doublets III and IV, and V and VI are thusly smaller in magnitude due to the residual undercorrection of the first doublet. The index difference at 4047 Angstroms at surface $R_2$ is 0.013, and the index difference at surfaces $R_5$ and $R_8$ are 0.046 and 0.041. Hence, surface $R_2$ having a small index difference may be greatly varied for chromatic correction without introducing excessive fifth order spherical aberration.

Considering Group B first for the axial case, element VII being a simple lens is accordingly bent into a meniscus shape in the direction of the falling full N.A. ray to minimize its contribution of spherical aberration. The final balancing of all orders of spherical aberration is left to elements VIII, IX, and especially element X. A breakdown of the Seidel Surface contributions for spherical aberration in arbitrary units is shown below with appropriate summations.

| Lens Element | Seidel Surface Contributions |
|---|---|
| I + II | −0.00675 |
| III + IV | +0.00191 |
| V + VI | +0.00369 |
| Total (Group A) | −0.00115 |
| VII | −0.00279 |
| VII + IX | −0.00128 |
| X | +0.00404 |
| Total (Group B) | −0.00003 |
| Total (Group A + Group B) | −0.00118 |

Figure 2:
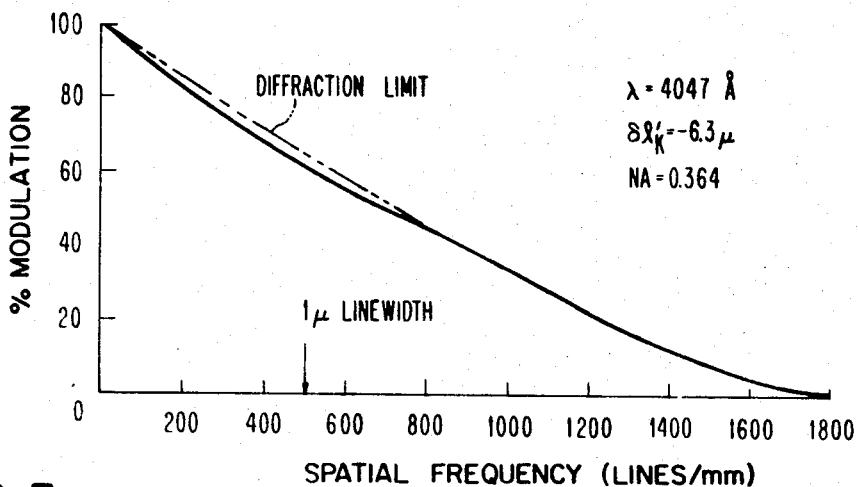
FIGS. 2, 3 and 4 are curves of the modulation transfer functions and phase angles of the lens system of FIG. 1 at axis, 0.7 field and full field respectively.

Note that Group A is undercorrected for third order spherical aberration while Group B is almost perfectly corrected. In fact, the entire lens up to element X is undercorrected and it remains for element X to introduce the correct amount of spherical aberration to balance the axial bundle. Also, the induced fifth order spherical aberration on element X is greatly reduced resulting in small orders of spherical aberration with ensuing small zonal residuals, thereby allowing the axial modulation transfer function to approach the diffraction limit as is shown in FIG. 2.

Referring next to the oblique aberrations of Group B, the mutually dependent Groups A and B are considered with respect to the proper balance between the axial and oblique aberrations. The distribution of bending between these groups determines whether the astigmatism can be reduced to a fraction of a micron over the desired field diagonal (2.8 mm.). As mentioned previously, the major bending is done by Group A and this value should be as large a fraction of the total bending as possible to maintain a high N.A. compatible with high optical correction. However, when the image distance (0.26 mm.) is kept constant, Group B then requires a minimum amount of bending to allow enough overcorrected astigmatism to balance the astigmatic undercorrection of Group A. If the bending of Group A were to increase and approach the total lens bending, Group B would necessarily decrease in bending and space $S_3$ would, of course, decrease to maintain a constant image distance. The result is a closely packed group of positive lenses abounding a somewhat central diaphragm with no ready means of obtaining overcorrected astigmatism. The extreme case of Group B having zero bending would yield a normal microscope objective, easily correctable for the axis but having very large amounts of astigmatism and field curvature.

Pursuing the opposite power distribution, if the bending of Group A were decreased and the bending of Group B accordingly increased, the airspace $S_3$ would become quite large to maintain a constant image distance. The astigmatic contribution of Group B would now be easily overcorrected to balance the undercorrection of Group A allowing a flat stigmatic field. To maintain the desired N.A., Group B would become more complex due to the smaller axial ray heights on the elements of this group together with its greater bending requirement.

The best balance of bending between Groups A and B is achieved by satisfying two conditions, each of which must be met in a reduction lens for microelectronic circuit fabrication. The two conditions are that Group A must have the maximum amount of the total lens bending to yield the best possible axial correction and that Group B must have sufficient bending to allow astigmatic correction. The correct balance of bending evolves by an iterative method. In this iterative method, which is carried out at a late stage in the optical design, the designer transfers power in minute amounts from Group B to Group A and then rebalances the axial and oblique aberrations while maintaining a constant image distance. After several iterations when it becomes barely possible to achieve an excellent astigmatic contribution hovering around a fraction of Rayleigh limit compatible with the best possible axial correction, the optimum solution is proven to exist.

A feature of the lens system of the present invention if the extremely low distortion value which is less than 0.0003 percent. The possibility of such a low value is effected by the shape of element X. All remaining compound and simple lens groups are meniscus and bent in the direction of the falling maximum N.A. axial ray as is normal for minimal spherical aberration.

Element X is biconcave and has its surface of greater curvature toward the incident converging ray bundle and is thus bent slightly against the direction of the falling maximum N.A. ray, not conducive to low zonal spherical aberrations. However, as previously mentioned, the preceding lens elements I through IX yield a total undercorrected spherical aberration and it remains for element X to introduce the proper amount of opposing spherical aberration to yield a total balance of the axial bundle. Finally, it should be noted that the paraxial ray height on lens X is small while the principal ray height is very large, effecting small axial aberration changes together with large oblique changes as a function of lens shape. Accordingly, a proper balance method for distortion is rendered. The requirement for distortion correction perforces a thin element of biconcave shape with a slight bending away from the image plane. If element X were bent toward the image plane instead of away from it, the axial correction would greatly improve due to a lowering of the large overcorrected surface contribution for spherical aberration at $R_{15}$ and a higher N.A. would be possible. Unfortunately, the distortion correction would not be possible and a feature of the lens would be lost, as is the well known case in state of the art lenses. The shape of element X is very sensitive with respect to distortion balance so toward the finalization of the lens design, its shape may be a vernier for distortion balance. Since element X is located very close to the image plane, the distortion varies greatly with lens shape while astigmation, coma, and spherical aberration vary successively less as is well known to lens designers.

Another important function of element X is its Petzvel sum which nearly annuls that of the rest of the lens system, thus, it additionally acts as a field flattener thus allowing a flat stigmatic field.

Figure 3:
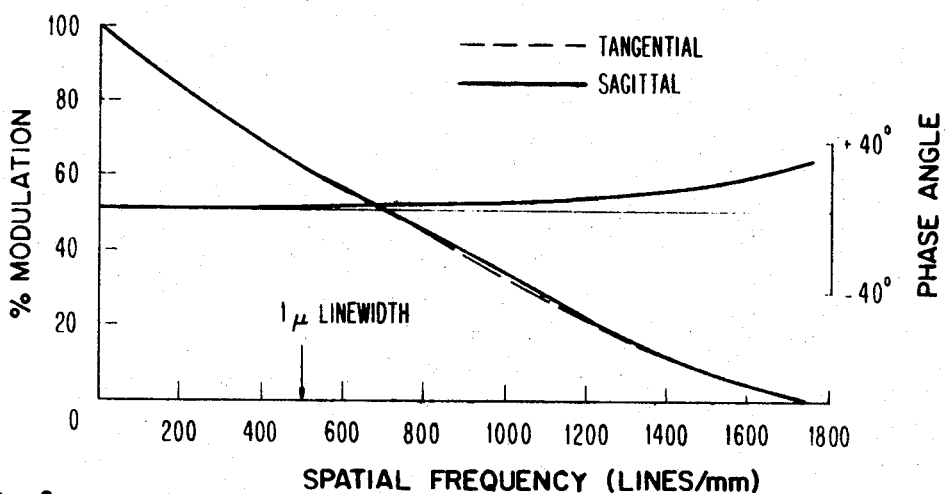
Figure 4:
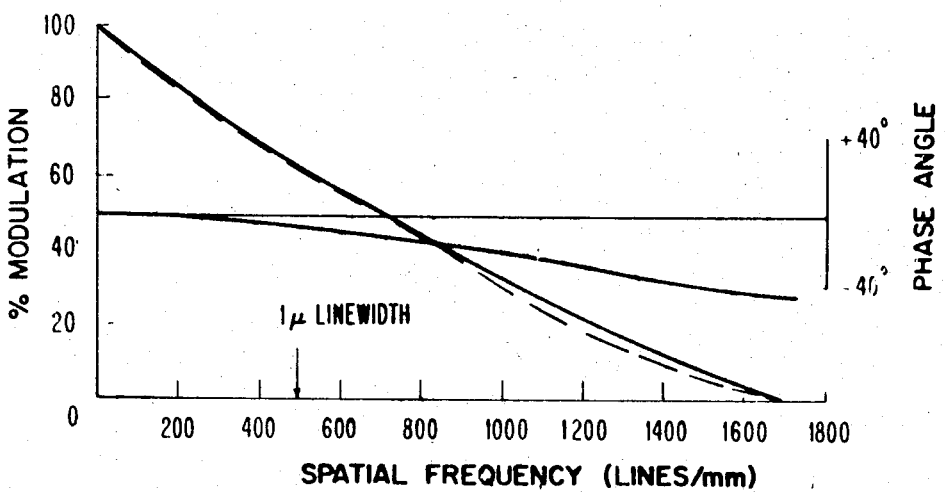

The optical performance of the present invention is extremely high and uniform over the static image field as can be seen from the curves in FIGS. 2, 3 and 4.

The modulation transfer functions have been calculated for the lens group at a focal length of approximately 40 millimeters at a reduction of 25X, and covering a linear image field diagonal of approximately 2.8 mm., all calculations being done at one focal setting, 6.3 microns in front of the paraxial image plane. As can be seen from the curves, the performance of the lens group is extremely uniform over the desired image field, especially at a spatial frequency of 500 line pairs per millimeter, corresponding to a linewidth of 1.0 micron. Since an application of the lens system of the present invention is in the production of microcircuits having different elemental linewidths of 1 micron and coarser, two conditions must be met to produce circuit lines with steep edge gradients and minimum fill-in in the clear spaces enclosed by large opaque geometries. The first condition is that the modulation in all meridians over the entire image field must be sufficiently high and the other condition is that the third harmonic of the different linewidths must exist and have a tolerable phase angle.

Consider the case of the finest linewidth (1 micron) desired in a microcircuit to be fabricated using the lens system of the present invention. At a spatial frequency of 500 line pairs per millimeter, or a one micron linewidth, the total variation in contrast over the entire chip (0.078 inches×0.078 inches) is only 1.5 percent denoting the uniform correction This uniformity is quite necessary since the elemental circuit lines at the corner of the chip are as important as the lines in the region of the lens axis. If the axial correction were excellent but the lens performance progressively deteriorated toward the corner of the chip, the modulation for a one micron line would correspondingly decrease and usable circuits would not be formed from corner to corner of the static field.

The average modulation at one micron lines is 60.5 percent compared with the diffraction limited value of 65.0 percent denoting a lens formula capable of yielding exceptionally clear lines over the entire chip. A lens modulation of at least 50 percent is required for production of microelectronics when all the various processes are considered with their inevitable deteriorations of the final product.

If all linewidths desired correspond to spatial frequencies above 30 percent of the limiting frequency, and the lens system is well corrected, the third harmonic will exist and steepen the edge gradient of the various circuit lines affording less critical exposure times. Also lines in the one micron range with slightly different line/gap ratios will be represented with their true geometries. This would not be possible if only the fundamental period of the desired frequencies were transmitted by the lens. To obtain, however, this advantage, a properly matched illumination system must be utilized.

Figure 5:
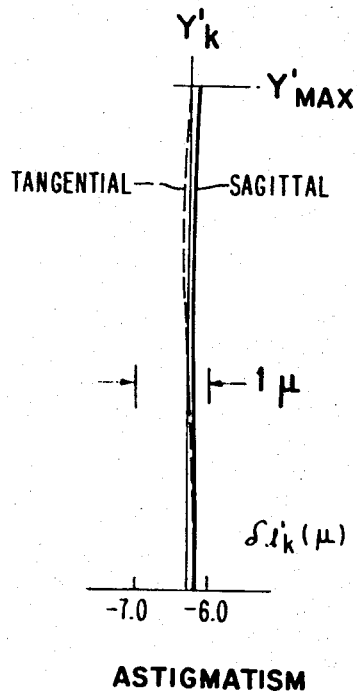
FIG. 5 shows a curve of the residual astigmatism of the lens of FIG. 1.

The residual astigmatism and field curvature is shown in FIG. 5 and shows a total departure from a flat plane of less than ±0.2 micron, quite insignificant when compared with the Rayleigh tolerance of ±1.5 microns. These small residuals greatly facilitate operation of the reduction camera during the exposure of the chip.

Figure 6:
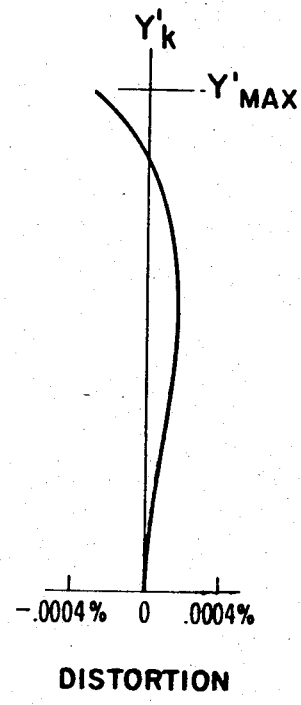
FIG. 6 shows a curve of the residual distortion of the lens of FIG. 1.

The residual distortion is shown in FIG. 6 and is immeasurable, resulting in true orthoscopic reproduction of electronic circuits. The zonal residuals of distortion are so small as to allow any part of the chip to be utilized during the setting for the correct reduction. If the distortion were excessive, the reduction measurements would have to be done in the region of the lens axis in order to achieve valid results.

The lens system parameters previously set forth in Table 1 is one embodiment of a lens system according to the present invention. Other embodiments of the system of FIG. 1 may be provided which provide the same performance characteristics. The embodiments are obtained from ranges of constructional data having upper and lower limits. The constructional ranges which specify the present invention are set forth in the following Table 2.

TABLE 2

| | |
|---|---|
| 1.77F<AzR$_1$<1.91F | 0.20F<$t_1$<0.25F |
| 1.77F<−R$_2$<1.91F | 0.068F<$t_2$<0.112F |
| 4.50F<+R$_3$<8.40F | 0.023F<S$_1$<0.028F |
| 1.15F<+R$_4$<1.30F | 0.19F<$t_3$<0.23F |
| 1.88F<−R$_5$<2.62F | 0.074F<$t_4$<0.106F |
| 2.09F<+R$_6$<2.90F | 0.023F<S$_2$<0.028F |
| 0.72F<+R$_7$<0.74F | 0.17F<$t_5$<0.19F |
| 3.25F<−R$_8$<3.80F | 0.079F<$t_6$<0.098F |
| 1.11F<+R$_9$<1.20F | 0.47F<S$_3$<0.48F |
| 0.69F<+R$_{10}$<0.76F | 0.079F<$t_7$<0.098F |
| 0.91F<+R$_{11}$<0.98F | 0.021F<S$_4$<0.029F |
| 0.52F<+R$_{12}$<0.55F | 0.10F<$t_8$<0.11F |
| 0.37F<−R$_{13}$<0.39F | 0.067F<$t_9$<0.075F |
| 9.70F<+R$_{14}$<15.0F | 0.032F<S$_5$<0.034F |
| 0.66F<−R$_{15}$<0.68F | 0.066F<$t_{10}$<0.071F |
| 0.88F<+R$_{16}$<0.90F | |

Eight additional embodiments of the present invention will be hereinafter set forth as embodiments two through nine. The embodiments have constructional data for the lens system of FIG. 1 within the ranges set forth in Table 2. After the embodiments are specified, the modulation transfer functions of the embodiments at axis, at 0.7 field, and at full field are compared in tabular form with the preferred embodiment illustrated in FIGS. 2, 3 and 4. The modulation transfer functions of embodiments two through nine cannot readily be compared graphically with those shown in FIGS. 2, 3 and 4 because the scale used would not show any distinction. This is an indication that all nine embodiments provide the same high performance as will other embodiments of the invention with the specified constructional ranges of FIG. 2.

EMBODIMENT TWO

| | |
|---|---|
| R$_1$=+1.8483F | $t_1$=0.2520F |
| R$_2$=−1.8437F | $t_2$=0.0680F |
| R$_3$=+6.4700F | S$_1$=0.0240F |
| R$_4$=+1.2285F | $t_3$=0.2132F |
| R$_5$=−2.1831F | $t_4$=0.0882F |
| R$_6$=+2.4816F | S$_2$=0.0252F |
| R$_7$=+0.7277F | $t_5$=0.1809F |
| R$_8$=−3.5424F | $t_6$=0.0882F |
| R$_9$=+1.1522F | S$_3$=0.4716F |
| R$_{10}$=+0.7259F | $t_7$=0.0882F |
| R$_{11}$=+0.9394F | S$_4$=0.0252F |
| R$_{12}$=+0.5257F | $t_8$=0.1059F |
| R$_{13}$=−0.3859F | $t_9$=0.0706F |
| R$_{14}$=+10.538F | S$_5$=0.0320F |
| R$_{15}$=−0.6692F | $t_{10}$=0.0680F |
| R$_{16}$=+0.8913F | |

In this embodiment $t_2$ is at the lower end of its range and the remaining parameters have been adjusted to retain the desired state of optical correction.

EMBODIMENT THREE

| | |
|---|---|
| R$_1$=+1.8514F | $t_1$=0.2274F |
| R$_2$=−1.8417F | $t_2$=0.0882F |
| R$_3$=+6.4295F | S$_1$=0.0258F |
| R$_4$=+1.2323F | $t_3$=0.2144F |
| R$_5$=−2.1565F | $t_4$=0.0882F |
| R$_6$=+2.5087F | S$_2$=0.0252F |
| R$_7$=+0.7328F | $t_5$=0.1814F |
| R$_8$=−3.4870F | $t_6$=0.0882F |
| R$_9$=+1.1581F | S$_3$=0.4713F |
| R$_{10}$=+0.7180F | $t_7$=0.0983F |
| R$_{11}$=+0.9452F | S$_4$=0.0214F |
| R$_{12}$=+0.5385F | $t_8$=0.1059F |
| R$_{13}$=−0.3818F | $t_9$=0.0706F |
| R$_{14}$=+15.075F | S$_5$=0.0326F |
| R$_{15}$=−0.6657F | $t_{10}$=0.0709F |
| R$_{16}$=+0.8984F | |

In this embodiment, $t_7$ and R$_{14}$ are at the upper ends of their range, etc.

EMBODIMENT FOUR

| | |
|---|---|
| R$_1$=+1.8997F | $t_1$=0.2286F |
| R$_2$=−1.8036F | $t_2$=0.0882F |
| R$_3$=+6.3915F | S$_1$=0.0269F |
| R$_4$=+1.2158F | $t_3$=0.2151F |
| R$_5$=−2.1395F | $t_4$=0.0882F |
| R$_6$=+2.5401F | S$_2$=0.0252F |
| R$_7$=+0.7293F | $t_5$=0.1820F |
| R$_8$=−3.4987F | $t_6$=0.0882F |
| R$_9$=+1.1561F | S$_3$=0.4721F |
| R$_{10}$=+0.7212F | $t_7$=0.0882F |
| R$_{11}$=+0.9421F | S$_4$=0.0252F |
| R$_{12}$=+0.5276F | $t_8$=0.1058F |
| R$_{13}$=−0.3857F | $t_9$=0.0706F |
| R$_{14}$=+9.9836F | S$_5$=0.0325F |
| R$_{15}$=−0.6668F | $t_{10}$=0.0685F |
| R$_{16}$=+0.8962F | |

In this embodiment, R$_{12}$ is near the lower end of its range.

EMBODIMENT FIVE

| | |
|---|---|
| $R_1=-1.8446F$ | $t_1=0.2240F$ |
| $R_2=-1.8491F$ | $t_2=0.0881F$ |
| $R_3=+6.2399F$ | $S_1=0.0228F$ |
| $R_4=+1.2294F$ | $t_3=0.2119F$ |
| $R_5=-2.1465F$ | $t_4=0.0881F$ |
| $R_6=+2.5240F$ | $S_2=0.0252F$ |
| $R_7=+0.7305F$ | $t_5=0.1759F$ |
| $R_8=-3.4946F$ | $t_6=0.0982F$ |
| $R_9=+1.1539F$ | $S_3=0.4698F$ |
| $R_{10}=+0.7335F$ | $t_7=0.0881F$ |
| $R_{11}=+0.9652F$ | $S_4=0.0252F$ |
| $R_{12}=+0.5289F$ | $t_8=0.1057F$ |
| $R_{13}=-0.3847F$ | $t_9=0.0705F$ |
| $R_{14}=+11.098F$ | $S_5=0.0318F$ |
| $R_{15}=-0.6711F$ | $t_{10}=0.0690F$ |
| $R_{16}=+0.8852F$ | |

In this embodiment, $t_6$ is at the upper end of its range.

EMBODIMENT SIX

| | |
|---|---|
| $R_1=+1.8519F$ | $t_1=0.2243F$ |
| $R_2=-1.8444F$ | $t_2=0.0883F$ |
| $R_3=+6.3432F$ | $S_1=0.0263F$ |
| $R_4=+1.2378F$ | $t_3=0.2153F$ |
| $R_5=-2.1372F$ | $t_4=0.0883F$ |
| $R_6=+2.5466F$ | $S_2=0.0252F$ |
| $R_7=+0.7277F$ | $t_5=0.1823F$ |
| $R_8=-3.5662F$ | $t_6=0.0883F$ |
| $R_9=+1.1498F$ | $S_3=0.4717F$ |
| $R_{10}=+0.7297F$ | $t_7=0.0883F$ |
| $R_{11}=+0.9517F$ | $S_4=0.0252F$ |
| $R_{12}=+0.5252F$ | $t_8=0.1059F$ |
| $R_{13}=-0.3863F$ | $t_9=0.0706F$ |
| $R_{14}=+9.7293F$ | $S_5=0.0325F$ |
| $R_{15}=-0.6670F$ | $t_{10}=0.0683F$ |
| $R_{16}=+0.8973F$ | |

In this embodiment, $R_{14}$ is at the lower end of its range.

EMBODIMENT SEVEN

| | |
|---|---|
| $R_1=+1.8360F$ | $t_1=0.2265F$ |
| $R_2=-1.8386F$ | $t_2=0.0881F$ |
| $R_3=+6.4280F$ | $S_1=0.0251F$ |
| $R_4=+1.2348F$ | $t_3=0.2139F$ |
| $R_5=-2.1654F$ | $t_4=0.0881F$ |
| $R_6=+2.4978F$ | $S_2=0.0282F$ |
| $R_7=+0.7279F$ | $t_5=0.1811F$ |
| $R_8=-3.5322F$ | $t_6=0.0881F$ |
| $R_9=+1.1501F$ | $S_3=0.4708F$ |
| $R_{10}=+0.7185F$ | $t_7=0.0881F$ |
| $R_{11}=+0.9430F$ | $S_4=0.0252F$ |
| $R_{12}=+0.5341F$ | $t_8=0.1057F$ |
| $R_{13}=-0.3829F$ | $t_9=0.0705F$ |
| $R_{14}=+12.838F$ | $S_5=0.0326F$ |
| $R_{15}=-0.6686F$ | $t_{10}=0.0680F$ |
| $R_{16}=+0.8897F$ | |

In this embodiment, $S_2$ is at the upper end of its range.

EMBODIMENT EIGHT

| | |
|---|---|
| $R_1=+1.9090F$ | $t_1=0.2243F$ |
| $R_2=-1.7692F$ | $t_2=0.0883F$ |
| $R_3=+8.4899F$ | $S_1=0.0227F$ |
| $R_4=+1.1495F$ | $t_3=0.2122F$ |
| $R_5=-2.6277F$ | $t_4=0.0883F$ |
| $R_6=+2.0813F$ | $S_2=0.0252F$ |
| $R_7=+0.7427F$ | $t_5=0.1798F$ |
| $R_8=-3.2840F$ | $t_6=0.0883F$ |
| $R_9=+1.1833F$ | $S_3=0.4707F$ |
| $R_{10}=+0.7348F$ | $t_7=0.0883F$ |
| $R_{11}=+0.9551F$ | $S_4=0.0252F$ |
| $R_{12}=+0.5308F$ | $t_8=0.1059F$ |
| $R_{13}=-0.3833F$ | $t_9=0.0706F$ |
| $R_{14}=+13.412F$ | $S_5=0.0319F$ |
| $R_{15}=-0.6733F$ | $t_{10}=0.0681F$ |
| $R_{16}=+0.8867F$ | |

In this embodiment, $R_4$ is at the lower end of its range.

EMBODIMENT NINE

| | |
|---|---|
| $R_1=+1.9211F$ | $t_1=0.2299F$ |
| $R_2=-1.8370F$ | $t_2=0.0881F$ |
| $R_3=+6.6806F$ | $S_1=0.0287F$ |
| $R_4=+1.2068F$ | $t_3=0.2157F$ |
| $R_5=-2.1710F$ | $t_4=0.0881F$ |
| $R_6=+2.4898F$ | $S_2=0.0252F$ |
| $R_7=+0.7305F$ | $t_5=0.1839F$ |
| $R_8=-3.5324F$ | $t_6=0.0880F$ |
| $R_9=+1.1503F$ | $S_3=0.4709F$ |
| $R_{10}=+0.6858F$ | $t_7=0.0881F$ |
| $R_{11}=+0.9071F$ | $S_4=0.0252F$ |
| $R_{12}=+0.5433F$ | $t_8=0.1057F$ |
| $R_{13}=-0.3809F$ | $t_9=0.0705F$ |
| $R_{14}=+15.456F$ | $S_5=0.0334F$ |
| $R_{15}=-0.6644F$ | $t_{10}=0.0679F$ |
| $R_{16}=+0.8975F$ | |

In this embodiment, $R_1$ is at the upper end of its range and $R_{10}$ is at the lower end of its range, etc.

The following table sets forth the modulation transfer functions (MTF) of the nine embodiments. It can be seen that although given parameters were selected at the ends of the ranges, the nine embodiments provide almost equal performance.

COMPARISON OF PREFERRED EMBODIMENT WITH OTHER EMBODIMENTS AT EDGES OF LIMITS

| Embodiment | Percent of limiting freq. | Percent MTF | | | | | Max. dist., percent |
|---|---|---|---|---|---|---|---|
| | | Axis | .7 field | | Full field | | |
| | | | Sag | Tan | Sag | Tan | |
| Preferred | 25 | 64.8 | 64.9 | 64.5 | 65.3 | 63.8 | .00027 |
| | 50 | 38.5 | 37.8 | 37.2 | 37.2 | 35.0 | |
| | 75 | 14.4 | 14.2 | 13.5 | 13.8 | 11.0 | |
| 2 | 25 | 64.8 | 64.7 | 64.5 | 64.8 | 64.1 | .00022 |
| | 50 | 38.1 | 37.2 | 36.9 | 36.5 | 35.4 | |
| | 75 | 14.4 | 13.9 | 13.3 | 13.4 | 11.7 | |
| 3 | 25 | 64.7 | 64.8 | 64.4 | 65.1 | 64.0 | .00026 |
| | 50 | 38.5 | 37.5 | 37.2 | 37.0 | 35.1 | |
| | 75 | 14.4 | 13.8 | 13.4 | 13.7 | 11.5 | |
| 4 | 25 | 64.5 | 64.4 | 63.6 | 64.9 | 64.2 | .00026 |
| | 50 | 38.3 | 37.1 | 36.3 | 36.9 | 35.8 | |
| | 75 | 14.4 | 13.6 | 13.0 | 13.6 | 12.3 | |
| 5 | 25 | 64.8 | 64.7 | 63.8 | 64.8 | 64.0 | .00023 |
| | 50 | 38.2 | 37.1 | 36.4 | 36.7 | 35.6 | |
| | 75 | 14.4 | 13.7 | 13.0 | 13.4 | 12.0 | |
| 6 | 25 | 64.8 | 64.8 | 64.0 | 64.8 | 64.2 | .00019 |
| | 50 | 38.3 | 37.4 | 36.3 | 36.5 | 35.6 | |
| | 75 | 14.4 | 14.2 | 12.6 | 13.5 | 12.7 | |
| 7 | 25 | 64.8 | 64.9 | 64.6 | 64.8 | 63.9 | .00021 |
| | 50 | 38.1 | 37.4 | 36.8 | 36.5 | 35.1 | |
| | 75 | 14.4 | 14.1 | 13.2 | 13.4 | 11.7 | |
| 8 | 25 | 64.2 | 64.8 | 64.1 | 65.5 | 64.4 | .00022 |
| | 50 | 38.6 | 38.0 | 37.3 | 37.8 | 36.0 | |
| | 75 | 14.4 | 14.2 | 13.7 | 14.2 | 12.1 | |
| 9 | 25 | 64.8 | 64.8 | 64.5 | 64.9 | 64.2 | .00027 |
| | 50 | 38.3 | 37.2 | 36.9 | 36.6 | 35.4 | |
| | 75 | 14.4 | 13.7 | 13.2 | 13.5 | 11.9 | |

Some parameters may be altered by very large amounts such as $t_2$ and $R_{14}$ both of which may be altered by 30 percent and the high state of optical correction again achieved by altering of the remaining parameters. Other parameters, such as $R_{15}$, $R_{16}$, and $S_3$ may vary only a small amount, not exceeding 2 percent. In general, element thicknesses may vary more widely than radii since, for example, a thick cemented doublet may be designed and corrected as readily as a thinner one with small radii adjustments. Thus, the lens thickness is not a contributing parameter to overall lens correcting structure. The former is borne out in embodiments two, three, and five while the latter is shown in embodiments four, eight and nine. Radius $R_{14}$ may vary by a large amount because its nominal value is so large with respect to the focal length. The same is true for $R_3$.

In all embodiments, the residual distortion is equal to or below the nominal distortion value of the preferred embodiment.

While the invention has been particularly shown and described with reference to preferred embodiments thereof, it will be understood by those skilled in the art that various changes in form and details may be made therein without departing from the spirit and scope of the invention.

What is claimed is:

1. A reduction lens system comprising first, second, third, fourth, fifth, sixth, seventh, eighth, ninth and tenth optically aligned lens elements wherein said first and second lens elements are cemented together, said third and fourth lens elements are cemented together, said fifth and sixth lens elements are cemented together and said eighth and ninth lens elements are cemented together to form four meniscus doublet lenses, wherein said first lens element has radii of curvature $R_1$ and $R_2$ and thickness $t_1$, said second lens element has radii of curvature $R_2$ and $R_3$ and thickness $t_2$, said third lens element has radii of curvature $R_4$ and $R_5$ and thickness $t_3$, said fourth lens element has radii of curvature $R_5$ and $R_6$ and thickness $t_4$, said fifth lens element has radii of curvature $R_7$ and $R_8$ and thickness $t_5$, said sixth lens element has radii of curvature $R_8$ and $R_9$ and thickness $t_6$, said seventh lens element has radii of curvature $R_{10}$ and $R_{11}$ and thickness $t_7$, said eighth lens element has radii of curvature $R_{12}$ and $R_{13}$ and thickness $t_8$, said ninth lens element has radii of curvature $R_{13}$ and $R_{14}$ and thickness $t_9$ and said tenth lens element has radii of curvature $R_{15}$ and $R_{16}$ and thickness $t_{10}$;

and wherein said second and third lens elements are separated by an axial distance $S_1$, said fourth and fifth lens elements are separated by an axial distance $S_2$, said sixth and seventh lens elements are separated by an axial distance $S_3$, said seventh and eighth lens elements are separated by an axial distance $S_4$ and said ninth and tenth lens elements are separated by an axial distance $S_5$;

ans wherein said radii, thicknesses and spacings are within limits as follows where F is the effective focal length of the lens group.

$1.77F < A_2R_1 < 1.91F$
$1.77F < -R_2 < 1.91F$
$4.50F < +R_3 < 8.40F$
$1.15F < +R_4 < 1.30F$
$1.88F < -R_5 < 2.62F$
$2.09F < +R_6 < 2.90F$
$0.72F < +R_7 < 0.74F$
$3.25F < -R_8 < 3.80F$
$1.11F < +R_9 < 1.20F$
$0.69F < +R_{10} < 0.76F$
$0.91F < +R_{11} < 0.98F$
$0.52F < +R_{12} < 0.55F$
$0.37F < -R_{13} < 0.39F$
$9.70F < +R_{14} < 15.0F$
$0.66F < -R_{15} < 0.68F$
$0.88F < +R_{16} < 0.90F$ $0.20F < t_1 < 0.25F$
$0.068F < t_2 < 0.112F$
$0.023F < S_1 < 0.028F$
$0.19F < t_3 < 0.23F$
$0.074F < t_4 < 0.106F$
$0.023F < S_2 < 0.028F$
$0.17F < t_5 < 0.19F$
$0.079F < t_6 < 0.098F$
$0.47F < S_3 < 0.48F$
$0.079F < t_7 < 0.098F$
$0.021F < S_4 < 0.029F$
$0.10F < t_8 < 0.11F$
$0.067F < t_9 < 0.075F$
$0.032F < S_5 < 0.034F$
$0.066F < t_{10} < 0.071F$

2. A reduction lens system according to claim 1 having numerical data as follows:

| Lens | Radius | Thickness (t) or airspace (S) | $N_D$ | V |
|---|---|---|---|---|
| I | $R_1 = +1.8395\ F$ | $t_1 = .2268\ F$ | 1.62032 | 60.3 |
| II | $R_2 = -1.8395\ F$ | $t_2 = .0882\ F$ | 1.61989 | 36.4 |
|  | $R_3 = +6.4619\ F$ | $S_1 = .0252\ F$ |  |  |
| III | $R_4 = +1.2354\ F$ | $t_3 = .2142\ F$ | 1.58256 | 46.5 |
| IV | $R_5 = -2.1726\ F$ | $t_4 = .0882\ F$ | 1.61989 | 36.4 |
|  | $R_6 = +2.4952\ F$ | $S_2 = .0252\ F$ |  |  |
| V | $R_7 = +0.7284\ F$ | $t_5 = .1815\ F$ | 1.58889 | 45.7 |
| VI | $R_8 = -3.5495\ F$ | $t_6 = .0882\ F$ | 1.61989 | 36.4 |
|  | $R_9 = +1.1508\ F$ | $S_3 = .4715\ F$ |  |  |
| VII | $R_{10} = +0.7200\ F$ | $t_7 = .0882\ F$ | 1.51733 | 52.2 |
|  | $R_{11} = +0.9439\ F$ | $S_4 = .0252\ F$ |  |  |
| VIII | $R_{12} = +0.5339\ F$ | $t_8 = .1058\ F$ | 1.51733 | 52.2 |
| IX | $R_{13} = -0.3836\ F$ | $t_9 = .0706\ F$ | 1.61989 | 36.4 |
|  | $R_{14} = +12.601\ F$ | $S_5 = .0328\ F$ |  |  |
| X | $R_{15} = -0.6690\ F$ | $t_{10} = .0680\ F$ | 1.61989 | 36.4 |
|  | $R_{16} = +0.8905\ F$ |  |  |  | where F represents the effective focal length of the lens group, $R_1$ through $R_{16}$ represent the respective radii of the successive lens surfaces, $t_1$ through $t_{10}$ designate the thickness of the lens elements and $S_1$ through $S_5$ represent the spacings between lens elements II and III, IV and V, VI and VII, VII and VIII, and IX and X respectively, and the designations $N_D$ and V, respectively, represent the refractive index and the Abbe number of each lens element.